US009311735B1

(12) United States Patent
Amirghodsi et al.

(10) Patent No.: US 9,311,735 B1
(45) Date of Patent: Apr. 12, 2016

(54) CLOUD BASED CONTENT AWARE FILL FOR IMAGES

(71) Applicant: Adobe Systems Incorporated, San Jose, CA (US)

(72) Inventors: Sohrab Amirghodsi, Seattle, WA (US); Aliakbar Darabi, Seattle, WA (US); Elya Schectman, Seattle, WA (US)

(73) Assignee: Adobe Systems Incorporated, San Jose, CA (US)

( * ) Notice: Subject to any disclaimer, the term of this patent is extended or adjusted under 35 U.S.C. 154(b) by 0 days.

(21) Appl. No.: 14/550,135

(22) Filed: Nov. 21, 2014

(51) Int. Cl.
*G06K 9/46* (2006.01)
*G06T 11/60* (2006.01)
*G06T 3/40* (2006.01)
*H04N 19/93* (2014.01)

(52) U.S. Cl.
CPC . *G06T 11/60* (2013.01); *G06T 3/40* (2013.01); *H04N 19/93* (2014.11)

(58) Field of Classification Search
CPC .............. H04N 19/93; H04N 7/26563; H04N 7/26579; H04N 7/26393; H04N 7/2651; H04N 7/50; H04N 7/26244; H04N 7/30; H04N 7/26335; H04N 7/26271; G06T 9/007; G06T 11/60; G06T 3/40
See application file for complete search history.

(56) References Cited

U.S. PATENT DOCUMENTS

| | | | | | |
|---|---|---|---|---|---|
| 5,832,126 | A | * | 11/1998 | Tanaka | H04N 1/41 382/176 |
| 7,103,406 | B2 | * | 9/2006 | Radeztsky | A61B 5/0402 600/485 |
| 7,460,131 | B2 | * | 12/2008 | Pan | G06T 9/00 345/600 |
| 8,553,777 | B2 | * | 10/2013 | Yin | H04N 7/50 375/240 |
| 8,798,158 | B2 | * | 8/2014 | Park | H04N 7/50 375/240.24 |
| 8,879,856 | B2 | * | 11/2014 | Raveendran | H04N 5/144 375/240 |
| 9,087,408 | B2 | * | 7/2015 | Furukawa | H04N 7/181 |
| 2007/0005795 | A1 | * | 1/2007 | Gonzalez | G06F 17/30017 709/232 |
| 2010/0232500 | A1 | * | 9/2010 | Lakus-Becker | H03M 7/30 375/240.12 |

OTHER PUBLICATIONS

Barnes, et al., "PatchMatch: A Randomized Correspondence Algorithm for Structural Image Editing", ACM SIGGRAPH 2009 Papers (New Orleans, Louisiana, Aug. 3-7, 2009), Aug. 3, 2009, 11 pages.
Wexler, et al., "Space-Time Completion of Video", IEEE Transactions on Pattern Analysis and Machine Intelligence, Vol. 29, No. 3, Mar. 2007, 14 pages.

* cited by examiner

*Primary Examiner* — Amir Alavi
(74) *Attorney, Agent, or Firm* — Wolfe-SBMC

(57) ABSTRACT

A region of an image on which a content aware fill operation is to be performed is identified by a device, the content aware fill operation replacing pixel values in the region based on pixel values from one or more other regions. The device generates a reduced-size version of the image by down sampling the image, and sends the reduced-size version of the image to a remote service. The remote service generates a mapping indicating which pixels in the reduced-size version of the image are to be used as the values of which other pixels in the region of the reduced-size version of the image. The mapping is compressed and returned to the device. The device decompresses the mapping and up samples the mapping. An output image is generated based on the originally obtained image, the up sampled mapping, and an indication of the region.

20 Claims, 9 Drawing Sheets

600

| | 604 | 606 | 608 | 610 | 612 | 614 |
|---|---|---|---|---|---|---|
| 602(1) → | Regions | Ox | Oy | Color Channel Count | Gain | Bias |
| 602(2) → | Regions | Ox | Oy | Color Channel Count | Gain | Bias |
| | | | | • • • | | |
| 602(t) → | Regions | Ox | Oy | Color Channel Count | Gain | Bias |

Fig. 6

CLOUD BASED CONTENT AWARE FILL FOR IMAGES

BACKGROUND

As computing technology has advanced and computing devices have become increasingly commonplace, people have come to use their devices in a variety of different manners. One such use is editing images on their computing devices. While users may enjoy the ability to edit images on their devices, such editing is not without its problems. One such problem is that image editing software can require significant memory or processor resources that many computing devices may not have, leading to user frustration with their devices.

SUMMARY

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

In accordance with one or more aspects, at a computing device an image is obtained and an indication of a first one or more regions of the image to be filled based on values of pixels in a second one or more regions of the obtained image is obtained. The obtained image is down sampled to generate a reduced-size version of the obtained image, and the reduced-size version of the obtained image is sent to a remote service, the remote service being implemented in one or more devices separate from the computing device. A map is received from the remote service, the map identifying, for each pixel in the first one or more regions, one or more pixels in the second one or more regions the values of which are to be used to generate the value for the pixel. An output image is generated using the map to determine values of pixels in the first one or more regions.

In accordance with one or more aspects, in a service a reduced-size version of an image is received from a computing device separate from the service. An indication of a first one or more regions of the reduced-size version of the image to be filled based on values of pixels in a second one or more regions of the reduced-size version of the image is also received from the computing device. For each pixel in the first one or more regions, one or more pixels in the second one or more regions the values of which are to be used to generate the value for the pixel are determined. A map is generated, the map identifying, for each pixel in the first one or more regions, one or more pixels in the second one or more regions the values of which are to be used to generate the value for the pixel. The map is returned to the computing device without returning a version of the image to the computing device.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

FIG. 6 illustrates an example table identifying regions of an image and offsets to those regions in accordance with one or more embodiments.

DETAILED DESCRIPTION

Cloud based content aware fill for images is discussed herein. An image is obtained at a computing device, and one or more regions of the image on which a content aware fill operation is to be performed are identified. A content aware fill operation is an operation that fills in one region of an image based on one or more other regions of the image, replacing pixel values in the one region with pixel values from the one or more other regions. The computing device generates a reduced-size version of the image by down sampling the image, and sends the reduced-size version of the image to a remote service via a network (e.g., the Internet).

The remote service performs part of a content aware fill process on the reduced-size version of the image, generating a mapping indicating which pixels in the reduced-size version of the image are to be used to determine the values of which other pixels (in the region to be filled) of the reduced-size version of the image. The mapping is compressed and returned to the computing device. The computing device decompresses the mapping and up samples the mapping to correspond to the size of the originally obtained image. An output image is generated by performing a convolution operation to generate the pixel values for the region of the image. This convolution operation is performed based on the originally obtained image and the up sampled mapping.

The convolution operation can be performed in stripes, which refer to blocks or strips of an image. For example, a stripe may be a certain number of pixels (e.g., 10 to 20) high and another number of pixels (the width of the originally obtained image) wide. The set of stripes then combine to generate the output image. By performing the convolution operation in stripes, memory constraints of the computing device are reduced because the computing device need not perform the convolution operation on the entire image at once.

Figure 1:
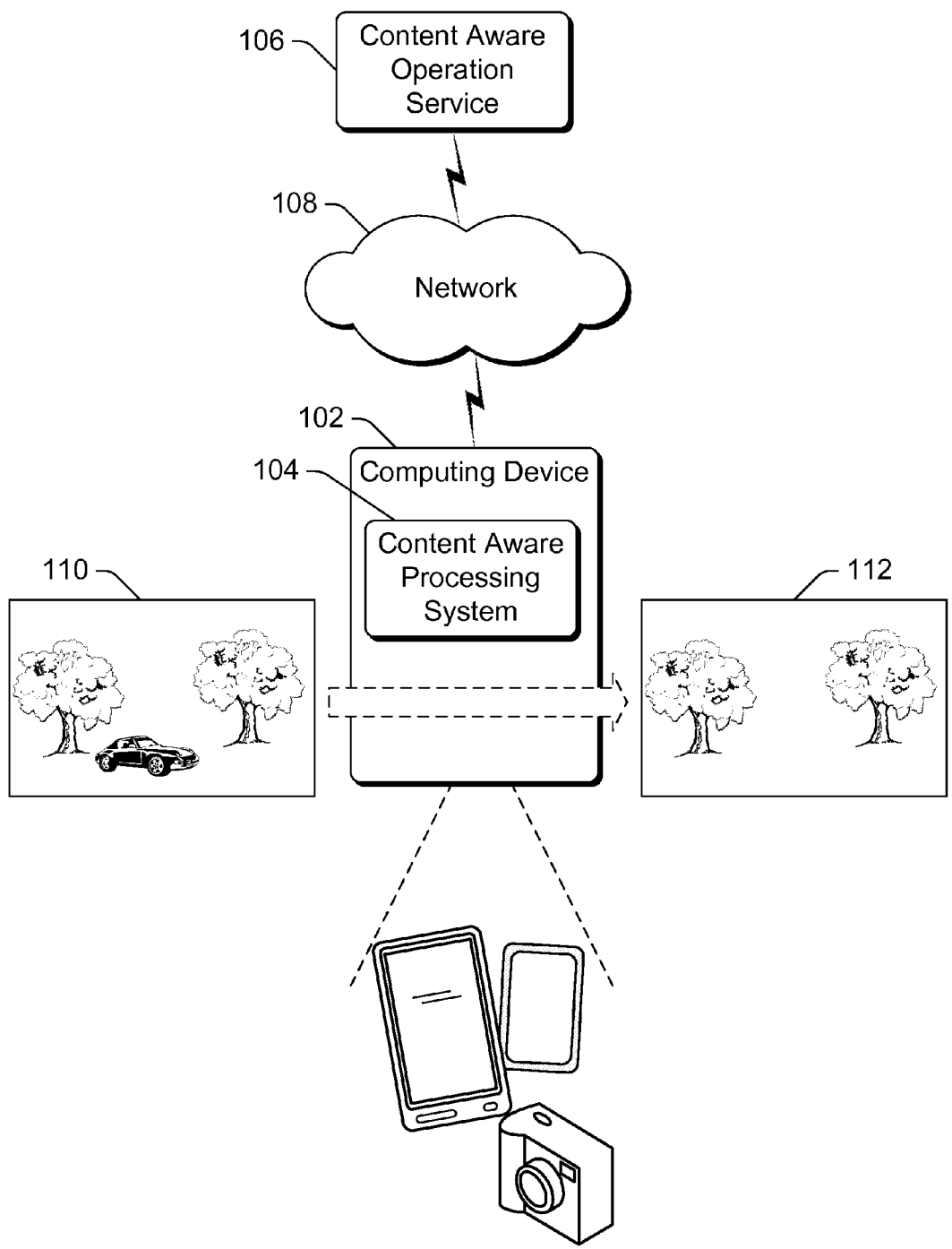
FIG. 1 is a block diagram illustrating an example environment implementing the cloud based content aware fill for images in accordance with one or more embodiments.

FIG. 1 is a block diagram illustrating an example environment 100 implementing the cloud based content aware fill for images in accordance with one or more embodiments. The environment 100 includes a computing device 102 that can be any of a variety of different types of devices that can edit or process images, also referred to as an image processing device. The computing device 102 is typically a low-resource device having insufficient resources (e.g., memory, processor performance, storage space) to perform content aware fill operations entirely on its own, or insufficient resources to perform content aware fill operations quickly enough to provide a good user experience. For example, the computing device 102 can be a netbook computer, a tablet or notepad computer, a set-top box communicatively coupled to a display device, a television or other display device, a cellular or other wireless phone (e.g., a smart phone), an automotive computer, a digital camera, a scanner or copier, and so forth.

The environment 100 supports performing a content aware fill operation on an image. Part of the content aware fill operation is performed by a content aware processing system 104 of the computing device 102, and part of the content aware fill operation is performed by a content aware operation service 106, which is a remote service accessed by the computing device 102 via a network 108. As illustrated in the example of FIG. 1, an input image 110 is obtained by the computing device 102, which generates (using the content aware processing system 104 and the content aware operation service 106) a corresponding content aware filled image 112 with a region of the input image 110 (illustrated as the car) being removed and replaced with pixel values from other locations in the input image 110.

The content aware operation service 106 is implemented by one or more devices that are physically separate from the computing device 102, and thus is referred to as remote from the computing device 102. The content aware operation service 106 can be implemented by a variety of different devices, typically devices with substantial memory and processor resources. For example, the content aware operation service 106 can be implemented by a server computer, a desktop computer, a server computer, a laptop computer, a game console, and so forth.

The content aware operation service 106 and the computing device 102 communicate with one another via the network 108. The network 108 can be a variety of different networks, including the Internet, a local area network (LAN), a public telephone network, an intranet, other public and/or proprietary networks, combinations thereof, and so forth. The network 108 can also be other types of wireless communication channels, such as a wireless universal serial bus communication channel.

As discussed in more detail below, to reduce bandwidth usage and transfer time between the computing device 102 and the content aware operation service 106, a reduced-size version of an image is communicated to the content aware operation service 106. The content aware operation service 106 performs the computationally expensive part of determining for a given region of the image what values from one or more other regions of the image to use to replace the pixels values in the region. The content aware operation service 106 generates a map indicating which pixels in the reduced-size version of the image are to be used as the values of which pixels in the given region of the reduced-size version of the image. This map is returned to the computing device 102, allowing the content aware processing system 104 to perform the less computationally expensive part of the content aware fill operation (replacing the values of pixels in the region based on the map).

Figure 2:
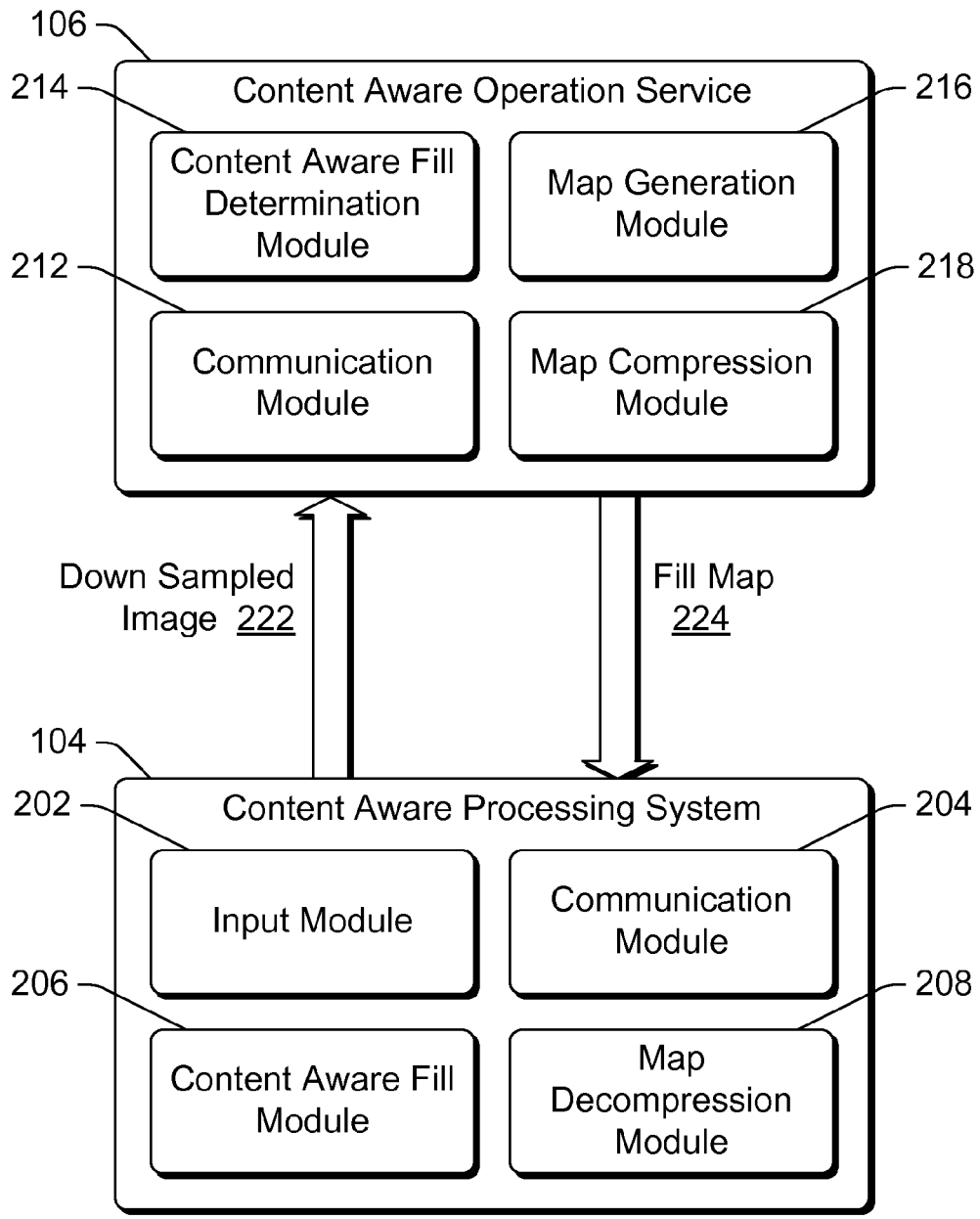
FIG. 2 illustrates an example content aware fill system in accordance with one or more embodiments.

FIG. 2 illustrates an example content aware fill system 200 in accordance with one or more embodiments. The content aware fill system 200 includes a content aware processing system 104 and a content aware operation service 106 as discussed above with reference to FIG. 1.

The content aware processing system 104 includes an input module 202, a communication module 204, a content aware fill module 206, and a map decompression module 208. The content aware operation service 106 includes a communication module 212, a content aware fill determination module 214, a map generation module 216, and a map compression module 218. Although particular functionality is discussed herein with reference to particular modules, it should be noted that the functionality of individual modules discussed herein can be separated into multiple modules, and/or at least some functionality of multiple modules discussed herein can be combined into a single module.

Input module 202 obtains an image, also referred to as an input image or the original image, on which a content aware fill operation is to be performed. The input module 202 can obtain the input image in various manners and from various sources, and can obtain the image from another component of the device implementing the system 104 or from a separate device. For example, the module 202 can obtain the image from an image capture component, retrieve the image from a storage device coupled to the device implementing the system 104, retrieve the image from a storage device accessed via a network, and so forth.

The input module 202 also obtains an indication of a region of the input image that is to be filled using the content aware fill operation. The indication can be received in a variety of different manners, such as from user input (e.g., outlining or tracing around a region of the displayed image with a cursor control device, finger, or other object), from another component or module of the computing device implementing the system 104, from another device, and so forth. The region that is to be filled can be various different regions in an image, such as a region including an object (e.g., a person, a vehicle, a sign, a portion of a building, etc.) that is to be removed from the image, a region that is to be fixed (e.g., a crack or other opening in a building, a hair or dust captured on the image, etc.), and so forth.

The communication module 204 communicates data to and from the communication module 212, allowing data to be communicated between the content aware processing system 104 and the content aware operation service 106. This data includes a down sampled image 222 that is a down sampled version of an input image (e.g., the image 110 of FIG. 1), and a fill map 224 that indicates which pixels in the reduced-size version of the image are to be used to determine the values of which pixels in the region of the reduced-size version of the image.

The content aware fill module 206 performs part of the content aware fill operation, including down sampling an image to be sent to the content aware operation service 106. The communication module 204 sends the down sampled image 222 to the communication module 212. The content aware fill determination module 214 determines which pixels in the down sampled image 222 are to be used as the values in the region of the down sampled image 222 that is being filled. The map generation module 216 generates a map identifying these determined pixels, and the generated map is compressed by the map compression module 218.

The communication module 212 returns the compressed map as the fill map 224, which is received by the communication module 204 and decompressed by the map decompression module 208. The content aware fill module 206 up samples the decompressed map, and performs a convolution operation to generate the pixel values for the region of the image. This convolution operation is performed based on the originally obtained image, the up sampled mapping, and an indication of the region.

Figure 3:
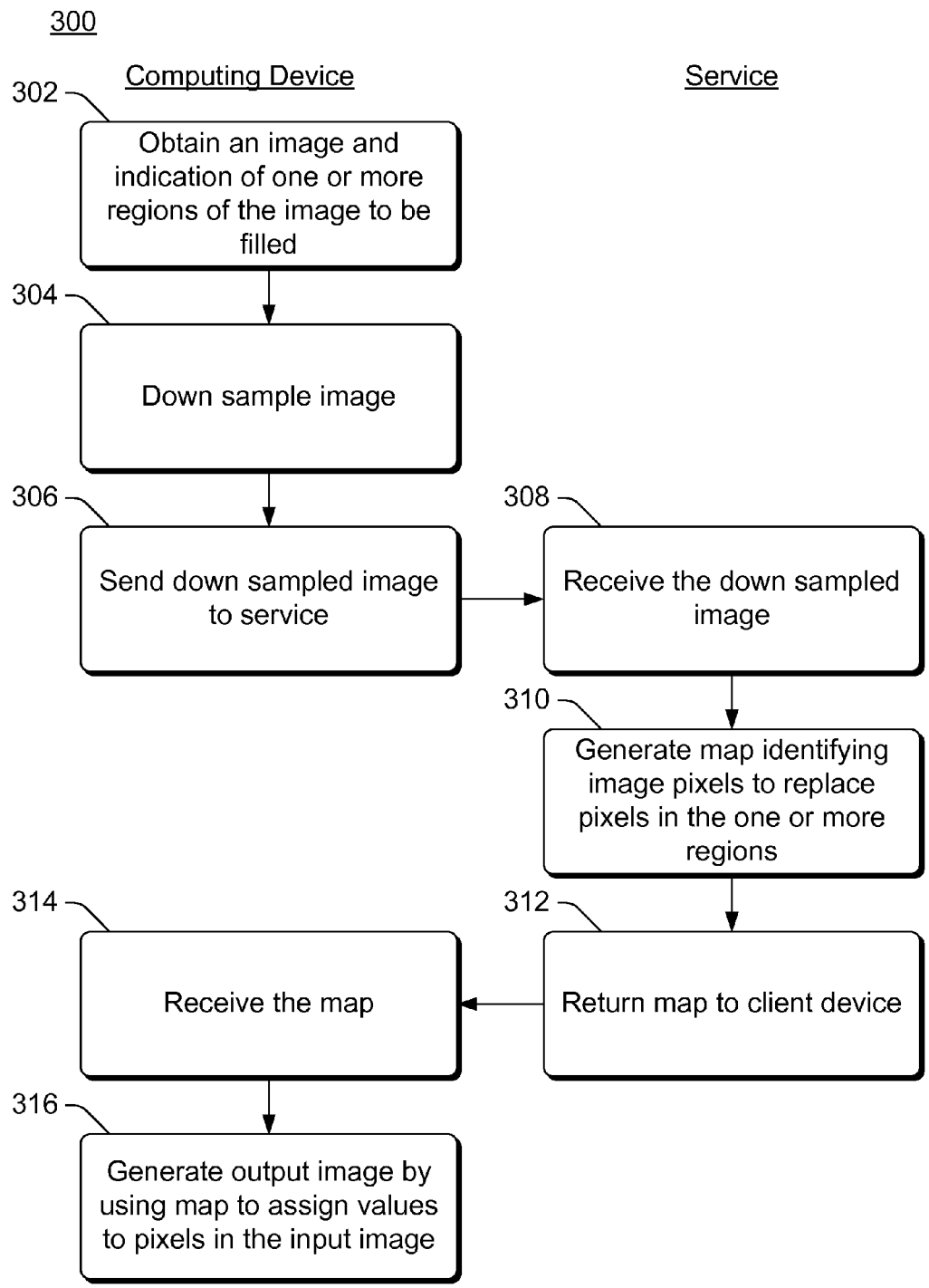
FIG. 3 is a flowchart illustrating an example process for performing a content aware fill operation in accordance with one or more embodiments.

FIG. 3 is a flowchart illustrating an example process 300 for performing a content aware fill operation in accordance with one or more embodiments. The process 300 can be implemented in software, firmware, hardware, or combinations thereof. Acts of the process 300 illustrated on the left-hand side of FIG. 3 are carried out by a computing device, such as the computing device 102 of FIG. 1 or a device implementing the content aware processing system 104 of FIG. 1 or FIG. 2, and can be implemented in software, firmware, hardware, or combinations thereof. Acts of the process 300 illustrated on the right-hand side of FIG. 3 are carried out by a remote service, such as the content aware operation service 106 of FIG. 1 or FIG. 2, and can be implemented in software, firmware, hardware, or combinations thereof. Process 300 is shown as a set of acts and is not limited to the order shown for performing the operations of the various acts. Process 300 is an example process for performing a content aware fill operation; additional discussions of performing a content aware fill operation are included herein with reference to different figures.

In process 300, an image and an indication of one or more regions of the image to be filled are obtained (act 302). The image can be obtained in any of a variety of different manners as discussed above, such as being captured by the computing device or being obtained from another device. The indication can be obtained in any of a variety of different manners as discussed above, such as by user input, from another component or module of the computing device, and so forth.

The obtained image is down sampled (act 304). Down sampling the image reduces the number of pixels in the image, thus generating a reduced-size version of the image obtained in act 302. The image can be down sampled various amounts, such as by a factor of 5 to 10, or down sampled to a particular size (e.g., 1 Megabyte). The down sampling can be performed using any of a variety of different public and/or proprietary techniques, such as a nearest neighbor technique, an averaging technique, a bilinear technique, a bicubic technique, and so forth.

The down sampled image is sent to the service (act 306), which receives the down sampled image (act 308). By sending a down sampled version of the originally obtained input image, usage of data transfer bandwidth between the computing device and the service is reduced relative to sending the obtained image, and the amount of time taken to transfer the down sampled image to the service is reduced relative to sending the obtained image.

The service generates a map (also referred to as a mapping) identifying image pixels to replace pixels in the one or more regions of the image to be filled (act 310). As part of the content aware fill process, for each pixel in the one or more regions, one or more other pixels in one or more other regions are identified as the pixels to use to replace the pixel. The map is an identifier or indication of these one or more other pixels. Which pixels of other regions in the image are to be used to replace the pixels in the one or more regions can be determined using any of a variety of public or proprietary techniques.

Figure 4:
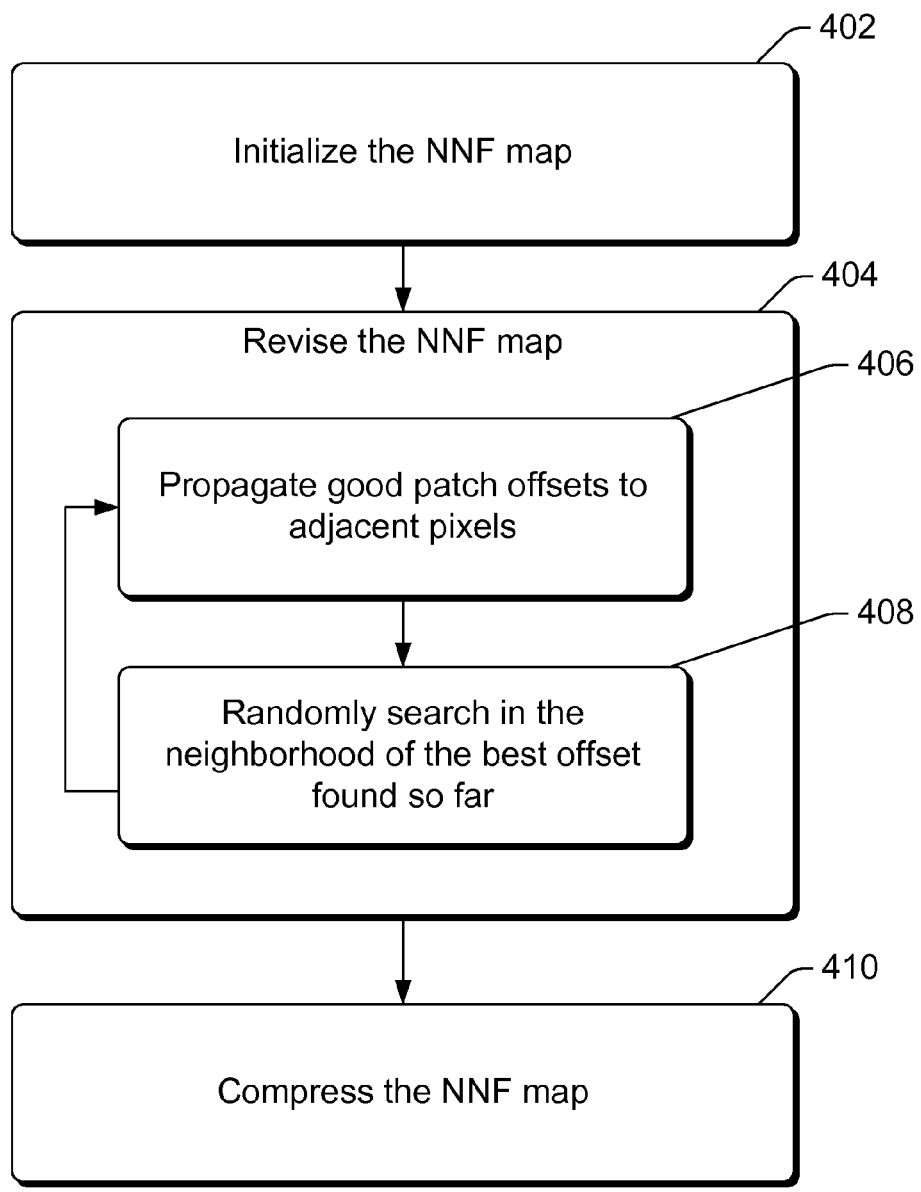
FIG. 4 is a flowchart illustrating an example process for generating a map identifying image pixels to replace pixels in one or more regions of an image to be filled in accordance with one or more embodiments.

FIG. 4 is a flowchart illustrating an example process 400 for generating a map identifying image pixels to replace pixels in the one or more regions of an image to be filled in accordance with one or more embodiments. The process 400 is carried out by a remote service, such as the content aware operation service 106 of FIG. 1 or FIG. 2, and can be implemented in software, firmware, hardware, or combinations thereof. The process 400 can implement, for example, act 310 of FIG. 3. The process 400 is shown as a set of acts and is not limited to the order shown for performing the operations of the various acts. Process 400 is an example process for generating a map identifying image pixels to replace pixels in the one or more regions of an image to be filled; additional discussions of generating a map identifying image pixels to replace pixels in the one or more regions of an image to be filled are included herein with reference to different figures.

The process 400 performs searches over a continuous translation domain using a generalized patch match algorithm in a multi-resolution manner from coarse to fine resolution. A map or mapping referred to as a nearest-neighbor field (NNF) is used to record the result of the search operation. An NNF map is defined as a function $f: A \to \mathbb{R}$ of offsets, which is defined over all possible patch coordinates (locations of patch centers) in an image A, for some distance function of two patches D. So, for a given patch coordinate a in image A and its corresponding nearest neighbor b in an image B, $f(a)$ is simply b−a. The image A can refer to one region of the received down sampled image (e.g., a region to be filled) and the image B can refer to another region of the received down sampled image (e.g., a region from which pixels are selected to fill the image A (the region to be filled)). A patch refers to a block of pixels that can vary in size, such as being a single pixel, being a 3×3 block of pixels, being a 7×7 block of pixels, and so forth. The NNF map is the map identifying image pixels to replace pixels in the one or more regions of an image to be filled.

In process 400, the NNF map is initialized (act 402). The NNF map can be initialized in various manners, such as by assigning random values to the NNF map or by using prior information. A coarse-to-fine gradual resizing process can be used, allowing an initial guess upscaled from a previous level in the pyramid can be used.

The NNF map is revised (act 404) by iteratively propagating good patch offsets to adjacent pixels (act 406) and randomly searching in the neighborhood of the best offset found so far (act 408). This propagation and random search can be iterated various number of times, such as a fixed number of times (e.g., 4 or 5 times). Alternatively, various other criteria can be used to determine when to cease iteration of the propagation and random search.

Each iteration of acts 406 and 408 proceeds as follows. Offsets are examined in a scan order (e.g., from left to right, top to bottom), and each undergoes propagation (act 406) followed by random search (act 408). These operations are interleaved at the patch level: if $P_j$ and $S_j$ denote, respectively, propagation and random search at patch j, then the operations proceed through a number n of packets in the order: $P_1, S_1, P_2, S_2, \ldots, P_n, S_n$.

In act 406, the good patch offsets are propagated to adjacent pixels by attempting to improve $f(x, y)$, where x,y is the coordinate of a pixel, using the known offsets of $f(x-1, y)$ and $f(x, y-1)$, assuming that the patch offsets are likely to be the same. For example, if there is a good mapping at (x−1, y), the translation of that mapping one pixel to the right is used for a mapping at (x, y). Let D(v) denote the patch distance (the error) between the patch at (x, y) in image A and patch (x, y)+v in image B. The new value for $f(x, y)$ is the arg min of $\{D(f(x, y)), D(f(x-1, y)), D(f(x, y-1))\}$. In one or more embodiments, on alternating (e.g., even) iterations, the propagation is up and left by examining offsets in reverse scan order, using $f(x+1, y)$ and $f(x, y+1)$ as the candidate offsets.

In act 408, the random search is performed as follows. Let $v_0 = f(x, y)$. An attempt to improve $f(x, y)$ is made by testing a sequence of candidate offsets at an exponentially decreasing distance from $v_0$: $u_i = v_0 + w\alpha^i R_i$ where $R_i$ is a uniform random in $[-1,1] \times [-1,1]$, w is a large maximum search "radius", and α is a fixed ratio between search window sizes. Patches for i=0, 1, 2, . . . are examined until the current search radius $w\alpha^i$ is below 1 pixel. In one or more embodiments, w is the maximum image dimension, and α=½, and the search window is clamped to the bounds of B.

The NNF map, as revised in act 404, is compressed (act 410). The NNF map can be compressed using any of a variety of public or proprietary compression techniques. In one or more embodiments, the NNF map is compressed using a lossless compression technique, although in some situations a lossy compression technique may be used.

Figure 5:
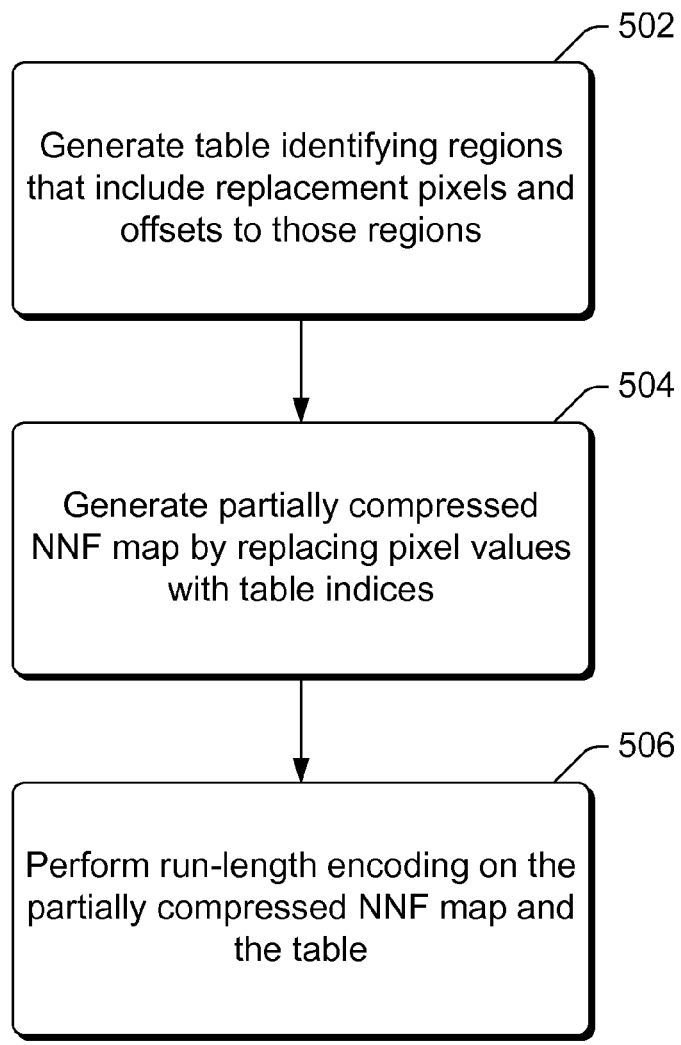
FIG. 5 is a flowchart illustrating an example process for compressing a map in accordance with one or more embodiments.

FIG. 5 is a flowchart illustrating an example process 500 for compressing the NNF map in accordance with one or more embodiments. The process 500 is carried out by a remote service, such as the content aware operation service 106 of FIG. 1 or FIG. 2, and can be implemented in software, firmware, hardware, or combinations thereof. The process 500 can implement, for example, act 410 of FIG. 4. The process 500 is shown as a set of acts and is not limited to the order shown for performing the operations of the various acts. The process 500 is an example process for compressing the NNF map; additional discussions of compressing the NNF map are included herein with reference to different figures.

The compression of the NNF illustrated in the process 500 leverages the coherency between a region being filled and other regions in the same image the values of which will replace the values of the pixels in the region being filled. For example, assume that (x,y) is the coordinate of a pixel in a patch that is to be filled (the fill patch), and (x',y') is the coordinate of the best patch (e.g., a source patch) in the region to use to fill that patch (e.g., as determined in the process 400 discussed above). The coherency indicates that a step in the fill patch corresponds to an equal step in the source patch. For example, (x+1, y) corresponds to (x'+1, y). This coherency property is a side effect of the map generation process of FIG. 4.

In process 500, a table identifying regions of an image that include replacement pixels and offsets to those regions is generated (act 502). The replacement pixels refer to the pixels the values of which replace the values of pixels in the region to be filled. The offsets to those regions are offsets relative to a pixel in the region to be filled. For example, if a pixel in the region to be filled has an (x,y) coordinate of 273,954, and the replacement pixel has an (x,y) coordinate of 200,900, then the offset is the difference between the x values and they values, which is 73,95.

FIG. 6 illustrates an example table 600 identifying regions of an image and offsets to those regions in accordance with one or more embodiments. The table 600 is an example of a table generated in act 502. The table 600 includes multiple (t) entries 602, each entry 602 corresponding to a region in the image.

Each entry includes a regions value 604, an Ox value 606, an Oy value 608, a color channel count value 610, a gain value 612, and a bias value 614. The regions value 604 is an identifier of a particular entry 602 in the table 600 (an index into the table 600). The Ox value 606 is the x component of the offset for the region, and the Oy value 608 is the y component of the offset for the region. The gain value 612 is the value of the gain for the region, and the bias value 614 is the value of the bias for the region. The color channel count 610 is an identifier of a particular one of multiple color channels. The gain value 612 and the bias value 614 are recorded for each color channel (e.g., in the red, green, blue (RGB) color space, the gain value 612 and the bias value 614 are recorded for each of the red, green, and color channels), and the color channel count 610 specifies which color channel the gain value 612 and the bias value 614 are for. Different parts of the region can have different gain and/or bias values, and thus different entries 602 can have the same offset (Ox value 606 and Oy value 608) but different gain values 612 or bias values 614. Although particular values are illustrated in the table 600, it should be noted that these are examples. Various additional values can be included in the table 600.

Returning to FIG. 5, a partially compressed NNF map is generated by replacing each pixel identified in the NNF map with an index into the table (act 504). For each identified pixel in the NNF map, a check is made as to whether a region that includes the identified pixel is already included in the table. A region that includes the identified pixel is already included in the table if an entry in the table satisfies the following constraints: the table entry has an offset value (e.g., Ox and Oy values) that can be used to identify the pixel (e.g., applying the offset from the table entry to the coordinates of the pixel to be filled results in the identified pixel), the table entry has a gain value that is the same as the gain value of the identified pixel, and the table entry has a bias value that is the as the bias value of the identified pixel.

If a table entry satisfies these constraints, then the identifier of the pixel in the NNF map is replaced with an identifier of the table entry that satisfies these constraints. If no table entry satisfies these constraints, then a new table entry is created that does satisfy these constraints (e.g., has an offset generated from the coordinates of the identified pixel, has a gain value the same as the identified pixel, and has a bias value the same as the identified pixel). The identifier of the pixel in the NNF map is then replaced with an identifier of the newly created table entry.

Whether a pixel satisfies these constraints can be determined in different manners. In one or more embodiments, the features (e.g., gain and bias) of an identified pixel is compared to each of its four neighbor pixels (the pixel above the identified pixel, the pixel below the identified pixel, the pixel to the left of the identified pixel, and the pixel to the right of the identified pixel). If the features of the identified pixel are the same as one of its four neighbor pixels, then the identified pixel satisfies the constraints and the identifier of the pixel in the NNF map is replaced with an identifier of the same table entry as the neighbor pixel having the same features.

Run-length encoding is then performed on the partially compressed NNF map generated in act 504 and the table generated in act 502 (act 506). The resultant run-length encoded partially compressed NNF map and table together are the compressed NNF map.

It should be noted that the compressed NNF map can be readily decompressed given knowledge of the process 500. The run-length encoding can be readily decoded to generate the partially compressed NNF map and the table. The NNF map can be readily decompressed by accessing, for each pixel in the region to be filled, the table entry identified by the partially compressed NNF map for the pixel. The offset from the table entry can then be applied to the coordinates of the pixel to identify the other pixel of the image on which filing of the pixel in the region is to be based.

Returning to FIG. 3, the generated map is returned to the computing device (act 312), which receives the map (act 314). It should be noted that although the map is returned to the computing device in act 312, the map can be (and typically is) returned without returning a version of the image to the computing device. For example, the down sampled image need not be returned to the computing device. Rather, the map can be used with the image obtained in act 302, as discussed in more detail below. By returning the map in act 312, usage of data transfer bandwidth between the computing device and the service is reduced relative to sending the down sampled image due to less data being sent to the computing device, and the amount of time taken to transfer the map to the computing device is reduced relative to sending the down sampled image.

An output image is generated by using the received map to assign values to pixels in the input image (act 316). In some situations as discussed above, the map generated in act 310 is compressed. In such situations, the compressed map is decompressed in act 316. The compressed map can be decompressed using any of a variety of public or proprietary techniques, and is decompressed based at least in part on the manner in which the map was compressed.

Each pixel in the one or more regions of the image obtained in act 302 is replaced with a pixel value determined based on the received map. The one or more regions are thus filled with values of pixels determined by the service in act 310. The output image generated in act 316 is thus a combination of the pixel values of the image obtained in act 302, and the pixel values determined by the service in act 310.

Figure 7:
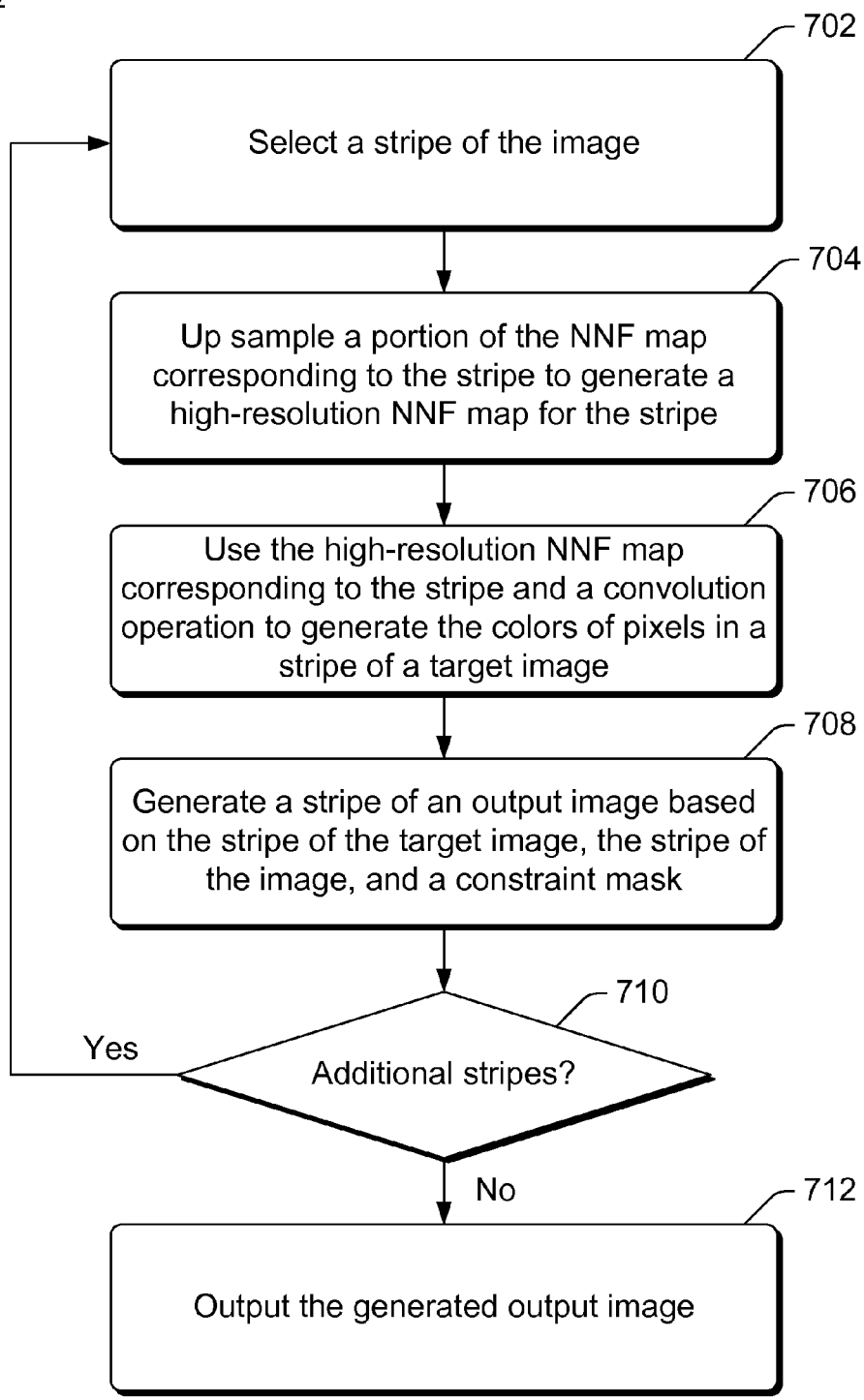
FIG. 7 is a flowchart illustrating an example process for generating an output image in accordance with one or more embodiments.

FIG. 7 is a flowchart illustrating an example process 700 for generating an output image in accordance with one or more embodiments. The process 700 is carried out by a computing device, such as the computing device 102 of FIG. 1 or a device implementing the content aware processing system 104 of FIG. 1 or FIG. 2, and can be implemented in software, firmware, hardware, or combinations thereof. The process 700 can implement, for example, act 316 of FIG. 3. The process 700 is shown as a set of acts and is not limited to the order shown for performing the operations of the various acts. Process 700 is an example process for generating an output image; additional discussions of generating an output image are included herein with reference to different figures.

In process 700, a stripe of the image is selected (act 702). The image refers to, for example, the originally obtained image (e.g., obtained in act 302 of FIG. 3). A stripe refers to a block or strip of the image, such as a block that is the full width of the image and a particular number of pixels (e.g., 10 to 20) in height of the image. Alternatively the stripe can be blocks or strips of other sizes or dimensions, such as a block that is the full height of the image and a particular number of pixels (e.g., 10 to 20) in width of the image, a block that is the half the width of the image and a particular number of pixels (e.g., 10 to 40) in width of the image, and so forth. In one or more embodiments, the size of the block is determined based on an amount of memory made available for the process 700. For example, the size of the block is selected so that the stripe of the image and an up sampled portion of the NNF map (as discussed in more detail below) can be stored in memory (e.g., random access memory) concurrently. The stripe is typically less than the entire image, although in some situations (e.g., in which there is sufficient memory in the computing device) the stripe is the entire image.

A portion of the NNF map corresponding to the stripe is up sampled to generate a high-resolution NNF map for the stripe (act 704). The portion of the NNF map that corresponds to the stripe is the portion of the NNF map that identifies (if the portion were to be up sampled) pixels in the stripe. Up sampling the portion of the NNF map increases the number of pixels identified in the image, the portion being up sampled to identify the pixels in the stripe of the image. The NNF map is up sampled by a same amount as the image was previously down sampled (e.g., in act 304 of FIG. 3), such as by a factor of 5 to 10. The up sampling can be performed using any of a variety of different public and/or proprietary techniques, such as a geometric up-sampling technique.

The high-resolution NNF map corresponding to the stripe and a convolution operation are used to generate the colors (values) of pixels in a stripe of a target image (act 706). Using the NNF map and the convolution operation for each of the one or more regions being filled, values for the pixels in the region that is being filled are generated. The convolution operation is an N*N*K*L convolution operation, where N is the dimension of the convolution filter (e.g., 7), and K and L are the dimensions of the portion of the region in the stripe. In one or more embodiments, the convolution operation is a simple box filtering. Each element of the NNF map points to the top left coordinate of a 7*7 window, and the sources pixels in the windows are averaged to compute the color value of the target pixel.

A stripe of an output image is generated based on the stripe of the target image, the stripe of the image, and a constraint mask (act 708). The stripe of the target image is the stripe generated in act 706, and the stripe of the image is the stripe selected in act 702. The constraint mask identifies which portions (e.g., on a pixel by pixel basis) of the target image stripe and the image stripe correspond to the region being filled, and which portions (e.g., on a pixel by pixel basis) of the target image stripe and the image stripe do not correspond to the region being filled. For each pixel in the stripe of the output image, the value of the pixel is the value of the pixel in the target image stripe if the constraint mask indicates the pixel is in the region being filled, and the value of the pixel is the value of the pixel in the image stripe if the constraint mask indicates the pixel is not in the region being filled.

Figure 8:
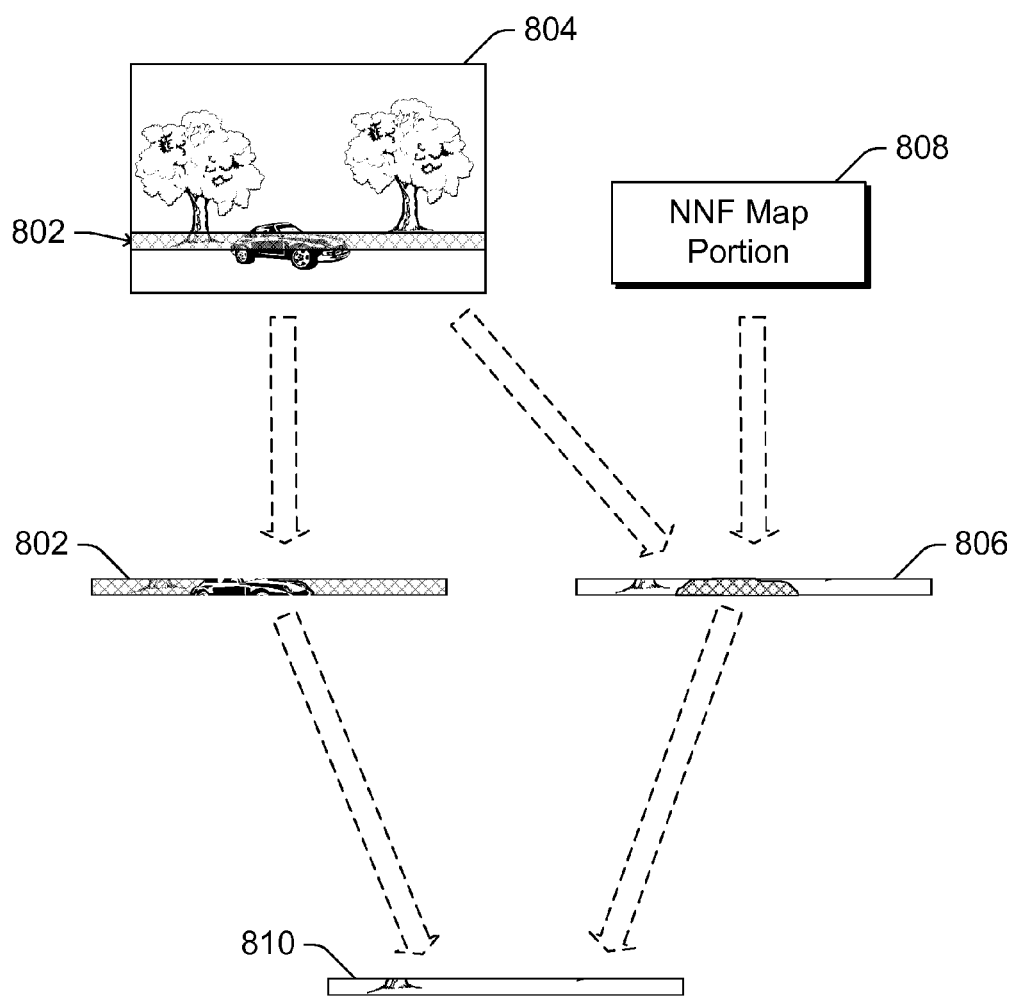
FIG. 8 is a diagram illustrating an example of stripes in accordance with one or more embodiments.

FIG. 8 is a diagram illustrating an example 800 of stripes in accordance with one or more embodiments. In the example 800, a stripe 802 of an image 804 is illustrated. A target stripe 806 is generated using the image 804, a portion of a high-resolution NNF map 808 corresponding to the stripe 802, and a convolution operation as discussed above. An output image stripe 810 is generated based on the stripe 802 and the target stripe 806. The output image stripe 810 includes portions of the stripe 802 illustrated with cross-hatching, and the portions of the target stripe 806 illustrated with cross-hatching.

Returning to FIG. 7, process 700 proceeds based on whether there are additional stripes in the image that have not yet been processed (act 710). If there is at least one stripe in the image that has not yet been processed by acts 704-708, then process 700 returns to act 702 to select one of the remaining stripes (one of the stripes that has not yet been processed).

However, if all of the stripes have been processed, then the generated output image is output (act 712). The generated output image is the image generated on a stripe by stripe basis in act 708. The output image can be output in a variety of different manners, such as being displayed by the computing device, being stored on the computing device, being transferred to another device, combinations thereof, and so forth.

Returning to FIG. 2, it should be noted that the content aware fill determination performed by the content aware operation service 106 is nondestructive in nature—the fill map 224 is returned to the content aware processing system, but the down sampled image 222 is not altered. This nondestructive nature of the content aware fill determination allows other operations to be performed substantially in parallel to the content aware fill. For example, content aware operation service 106 can perform additional operations on the down sampled image 222, the down sampled image 222 or originally obtained image can be provided to one or more other services to have additional operations performed, the content aware processing system 104 can perform additional operations on the down sampled image 222 or the originally obtained image, and so forth.

Various different additional operations can be performed on the image. These additional operations can be any operations that filter or convert the image without changing the structure of the image. For example, these additional operations can include one or a combination of color conversion (e.g., from color to greyscale or sepia), a gradient filter, a Gaussian blur filter, bilateral filtering, a de-noising filter, a sharpening filter, and so forth.

The image resulting from any of these operations can be readily combined with the content aware fill operation. For example, the process 700 can operate on the image resulting from any of these operations rather than the originally obtained image (e.g., using stripes of a sharpened image obtained from a sharpening filter rather than stripes of the originally obtained image).

Various actions performed by various modules are discussed herein. A particular module discussed herein as performing an action includes that particular module itself performing the action, or alternatively that particular module invoking or otherwise accessing another component or module that performs the action (or performs the action in conjunction with that particular module). Thus, a particular module performing an action includes that particular module itself performing the action and/or another module invoked or otherwise accessed by that particular module performing the action.

Figure 9:
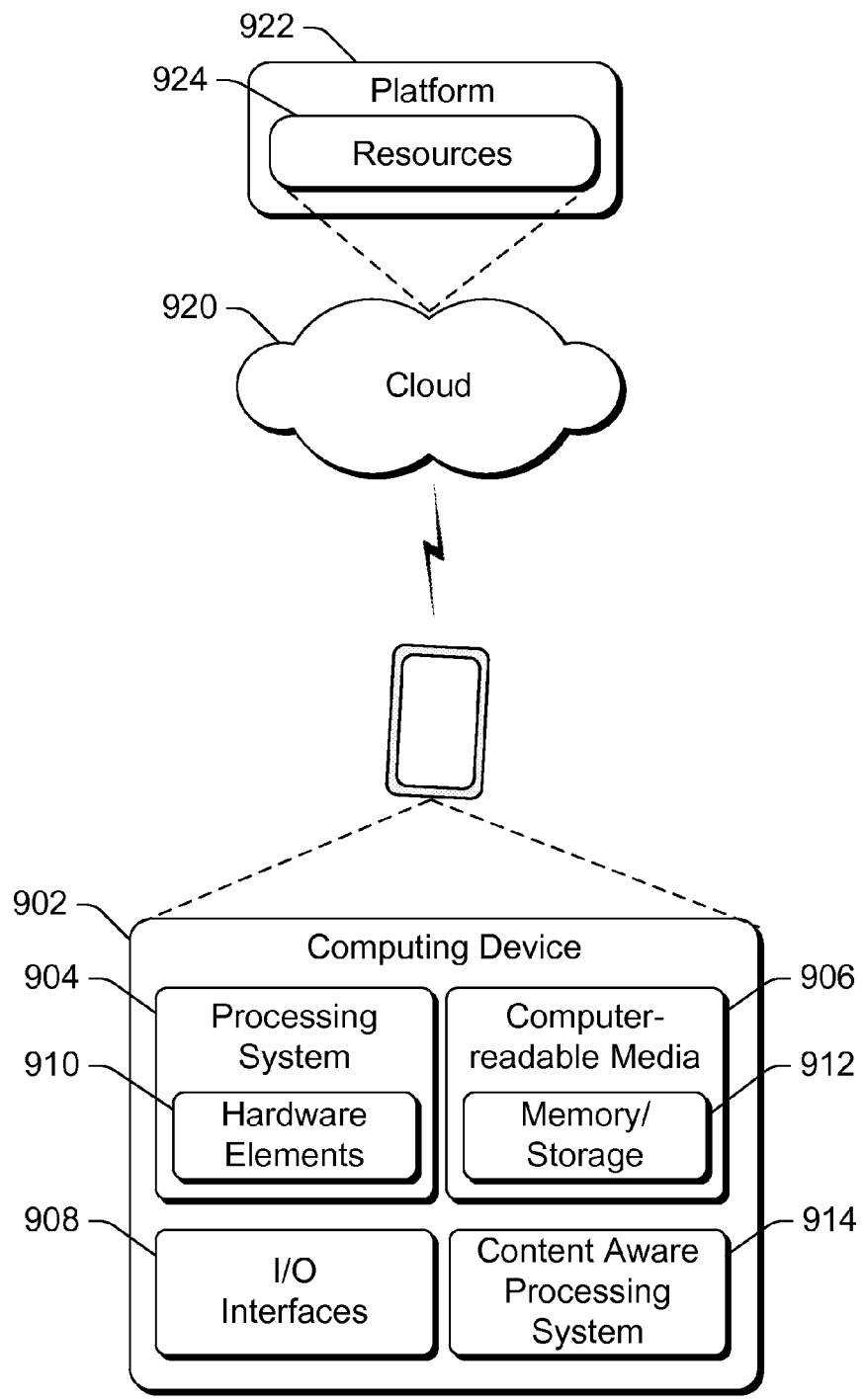
FIG. 9 illustrates an example system that includes an example computing device that is representative of one or more computing systems and/or devices that may implement the various techniques described herein.

FIG. 9 illustrates an example system generally at 900 that includes an example computing device 902 that is representative of one or more computing systems and/or devices that may implement the various techniques described herein. This is illustrated through inclusion of the content aware processing system 914, which may be configured to perform a content aware fill operation as discussed herein. Computing device 902 may be, for example, a server of a service provider, a device associated with a client (e.g., a client device), an on-chip system, and/or any other suitable computing device or computing system.

The example computing device 902 as illustrated includes a processing system 904, one or more computer-readable media 906, and one or more I/O interfaces 908 that are communicatively coupled, one to another. Although not shown, computing device 902 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

Processing system 904 is representative of functionality to perform one or more operations using hardware. Accordingly, processing system 904 is illustrated as including hardware elements 910 that may be configured as processors, functional blocks, and so forth. This may include implementation in hardware as an application specific integrated circuit or other logic device formed using one or more semiconductors. Hardware elements 910 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

Computer-readable storage media 906 is illustrated as including memory/storage 912. Memory/storage 912 represents memory/storage capacity associated with one or more computer-readable media. Memory/storage component 912 may include volatile media (such as random access memory (RAM)) and/or nonvolatile media (such as read only memory (ROM), Flash memory, optical disks, magnetic disks, and so forth). Memory/storage component 912 may include fixed media (e.g., RAM, ROM, a fixed hard drive, and so on) as well as removable media (e.g., Flash memory, a removable hard drive, an optical disc, and so forth). Computer-readable media 906 may be configured in a variety of other ways as further described below.

Input/output interface(s) 908 are representative of functionality to allow a user to enter commands and information to computing device 902, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, computing device 902 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of computing platforms having a variety of processors.

An implementation of the described modules and techniques may be stored on or transmitted across some form of computer-readable media. The computer-readable media may include a variety of media that may be accessed by computing device 902. By way of example, and not limitation, computer-readable media may include "computer-readable storage media" and "computer-readable signal media."

"Computer-readable storage media" refer to media and/or devices that enable persistent and/or non-transitory storage of information in contrast to mere signal transmission, carrier waves, or signals per se. Computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 902, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 910 and computer-readable media 906 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 910. Computing device 902 may be configured to implement particular instructions and/or functions corresponding to the software and/or hardware modules. Accordingly, implementation of a module that is executable by computing device 902 as software may be achieved at least partially in hardware, e.g., through use of computer-readable storage media and/or hardware elements 910 of processing system 904. The instructions and/or functions may be executable/operable by one or more articles of manufacture (for example, one or more computing devices 902 and/or processing systems 904) to implement techniques, modules, and examples described herein.

The techniques described herein may be supported by various configurations of computing device 902 and are not limited to the specific examples of the techniques described herein. This functionality may also be implemented all or in part through use of a distributed system, such as over a "cloud" 920 via a platform 922 as described below.

Cloud 920 includes and/or is representative of a platform 922 for resources 924. Platform 922 abstracts underlying functionality of hardware (e.g., servers) and software resources of cloud 920. Resources 924 may include applications and/or data that can be utilized while computer processing is executed on servers that are remote from computing device 902. Resources 924 can also include services provided over the Internet and/or through a subscriber network, such as a cellular or Wi-Fi network.

Platform 922 may abstract resources and functions to connect computing device 902 with other computing devices. Platform 922 may also serve to abstract scaling of resources to provide a corresponding level of scale to encountered demand for resources 924 that are implemented via platform 922. Accordingly, in an interconnected device embodiment, implementation of functionality described herein may be distributed throughout system 900. For example, the functionality may be implemented in part on computing device 902 as well as via platform 922 that abstracts the functionality of the cloud 920.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method implemented in a computing device, the method comprising:
    obtaining an image;
    obtaining an indication of a first one or more regions of the image to be filled based on values of pixels in a second one or more regions of the obtained image;
    down sampling the obtained image to generate a reduced-size version of the obtained image;
    sending the reduced-size version of the obtained image to a remote service, the remote service being implemented in one or more devices separate from the computing device;
    receiving from the remote service a map identifying, for each pixel in the first one or more regions, one or more pixels in the second one or more regions the values of which are to be used to generate the value for the pixel; and
    generating an output image, the generating including using the map to determine values of pixels in the first one or more regions.

2. The method as recited in claim 1, the receiving comprising receiving the map without receiving a version of the image.

3. The method as recited in claim 1, the received map comprising a compressed map, and the method further comprising generating a decompressed map by decompressing the received map, and the generating the output image including using the decompressed map to determine the values of pixels in the first one or more regions.

4. The method as recited in claim 3, the received map including a partially compressed map and a table, the decompressing the received map comprising, for each pixel in the first one or more regions of the image:
    obtaining, from the partially compressed map, an identifier of an entry in the table;
    obtaining, from the entry in the table, an offset for the pixel;
    applying the offset to a coordinate of the pixel to generate an offset coordinate; and
    using the offset coordinate as the identifier of the pixel in the decompressed map.

5. The method as recited in claim 1, further comprising up sampling the map before generating the output image.

6. The method as recited in claim 1, further comprising:
    receiving an additional version of the image that has been filtered or converted; and
    the generating the output image comprising generating the output image based on the additional version of the image rather than the obtained image.

7. The method as recited in claim 6, the generating the output image comprising using the map to determine values of pixels in the first one or more regions of the additional version of the image.

8. The method as recited in claim 1, the generating comprising generating the output image on a stripe by stripe basis, each of multiple stripes comprising a block of the obtained image that is less than the entire obtained image.

9. The method as recited in claim 8, further comprising, for each stripe, up sampling a portion of the map corresponding to a stripe of the obtained image before generating a stripe of the output image.

10. A method implemented in a service that includes one or more computing devices, the method comprising:
  receiving, from a computing device separate from the service, a reduced-size version of an image;
  receiving, from the computing device, an indication of a first one or more regions of the reduced-size version of the image to be filled based on values of pixels in a second one or more regions of the reduced-size version of the image;
  determining, for each pixel in the first one or more regions, one or more pixels in the second one or more regions the values of which are to be used to generate the value for the pixel;
  generating a map identifying, for each pixel in the first one or more regions, one or more pixels in the second one or more regions the values of which are to be used to generate the value for the pixel; and
  returning the map to the computing device without returning a version of the image to the computing device.

11. The method as recited in claim 10, further comprising compressing the map, and the returning comprising returning the compressed map to the computing device.

12. The method as recited in claim 11, the compressing the map comprising:
  generating a partially compressed map by, for each pixel in the first one or more regions of the reduced-size version of the image, including in the partially compressed map an identifier of an entry in a table, the entry in the table including an offset value that, when applied to a coordinate of the pixel, results in a coordinate of a particular pixel in the second region that is to be used to generate the value for the pixel, the entry including a gain value and a bias value for the particular pixel in the second region; and
  generating the compressed map by applying run-length encoding to the partially compressed map and the table.

13. The method as recited in claim 12, further comprising generating a new entry in the table in response to no entry in the table having constraints that satisfy the particular pixel in the second region.

14. A computing device comprising:
  an input module configured to obtain an image and an indication of a first one or more regions of the image to be filled based on values of pixels in a second one or more regions of the obtained image;
  a content aware fill module configured to down sample the obtained image to generate a down sampled version of the obtained image;
  a communication module configured to send the down sampled version of the image obtained image to a remote service, the remote service being implemented in one or more devices separate from the computing device, and further configured to receive from the remote service a map identifying, for each pixel in the first one or more regions, one or more pixels in the second one or more regions the values of which are to be used to generate the value for the pixel; and
  the content aware fill module being further configured to generate an output image by using the map to determine values of pixels in the first one or more regions.

15. The computing device as recited in claim 14, the communication module being further configured to receive the map without receiving a version of the image from the remote service.

16. The computing device as recited in claim 14, the map comprising a compressed nearest-neighbor field (NNF) map, the computing device further comprising a map decompression module configured to generate a decompressed map by decompressing the received map, and the content aware fill being further configured to generate the output image by using the decompressed map.

17. The computing device as recited in claim 14, the content aware fill module being further configured to generate the output image on a stripe by stripe basis, each of multiple stripes comprising a block of the obtained image that is less the entire obtained image.

18. The computing device as recited in claim 17, the content aware fill module being further configured to, for each stripe, up sample a portion of the map corresponding to the obtained image before generating a stripe of the output image.

19. The computing device as recited in claim 14, the communication module being further configured to receive an additional version of the image that has been filtered or converted, and the content aware fill module being further configured to generate the output image based on the additional version of the image rather than the obtained image.

20. The computing device as recited in claim 14, the content aware fill module being further configured to:
  receive an additional version of the image that has been filtered or converted by an additional remote service; and
  generate the output image based on the additional version of the image rather than the obtained image by using the map to determine values of pixels in the first one or more regions of the additional version of the image.

* * * * *